April 1, 1952  R. UDY  2,591,028
HARROW ATTACHMENT FOR TRACTORS
Filed April 19, 1948
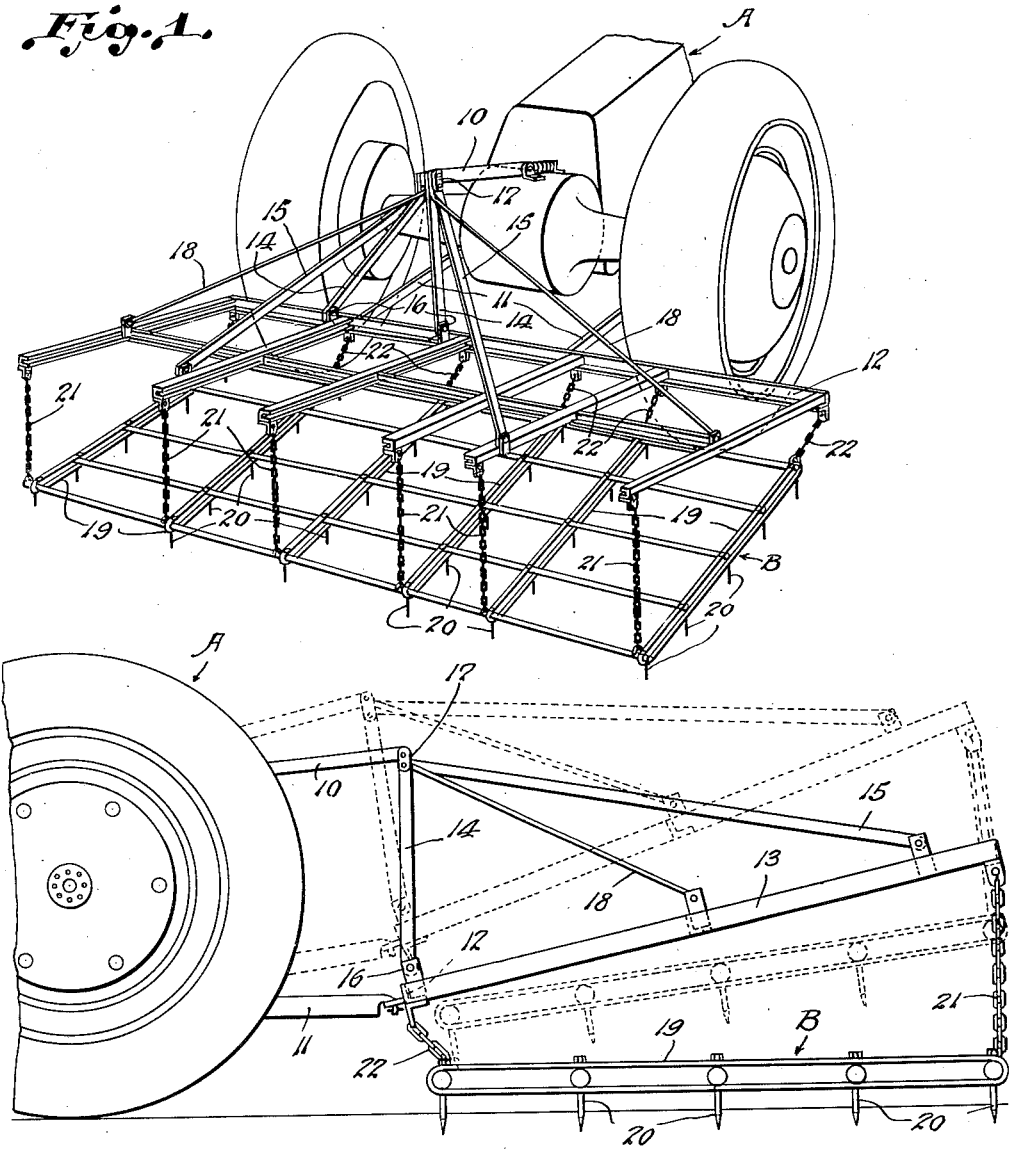
INVENTOR.
Ray Udy
BY
ATTORNEY.

Patented Apr. 1, 1952

2,591,028

UNITED STATES PATENT OFFICE 2,591,028

HARROW ATTACHMENT FOR TRACTORS

Ray Udy, Lapwai, Idaho

Application April 19, 1948, Serial No. 21,963

1 Claim. (Cl. 55—88)

The invention relates to a harrow lift attachment for a tractor, and more especially to a harrow-carrier for the hydraulic lift-mechanism of a tractor.

The primary object of the invention is the provision of an attachment of this character, wherein a harrow, either of the single or plural frame type, is fixedly suspended from a lift assembly, hydraulically controlled, of a tractor, of any wheeled well known construction, so that the entire set-up can be used in preparing fall-plowed land for spring seeding, eradicating many noxious weeds, cultivating pastures, renovating the latter, fitting stubble land for seeding, making seedbeds without turning the surface, tilling gardens and greenhouse beds and other cultivating purposes.

Another object of the invention is the provision of an attachment of this character, wherein the harrow under its flexible suspension becomes a unit with the tractor in a minute or so, it being raised, lowered and operated at desired working depth by the lift assembly of the tractor, close coupled, and makes an implement of great utility.

A further object of the invention is the provision of an attachment of this character, wherein the harrow while it is in working position will be pulled true, and without any bucking action aft thereof, while under automatic lifting operation the ground working elements of such harrow will clear the ground surface.

A still further object of the invention is the provision of an attachment of this character, which is simple in construction, thoroughly reliable and efficient in operation, strong, durable, compact, easy lifting, safe, conveniently transported, quick turning, easily backed into corners, assures saving of time and effort, and better work.

With these and other objects in view the invention consists in the features of construction, combination and arrangement of parts as will be hereinafter more fully described in detail, illustrated in the accompanying drawings, which disclose the preferred embodiment of the invention, and pointed out in the claim hereunto appended. It is of course understood that changes, variations and modifications may be made in the invention, as fall properly within the scope of the claims appended, without departing from the spirit of the said invention or sacrificing any of its advantages.

In the accompanying drawings:

Figure 1 is a fragmentary perspective view of a tractor showing the attachment constructed in accordance with the invention applied and in ground working position.

Figure 2 is a fragmentary side elevation thereof.

Similar reference characters indicate corresponding parts throughout the several views in the drawings.

Referring to the drawings in detail, A designates generally the aft portion of a standard type of a wheeled tractor having the usual hydraulic lift mechanism, the details of which are not shown, excepting the means in this instance in the form of a throw arm 10, together with coupling links 11, respectively, these being effective for raising a ground-working implement off the surface of the ground. The coupling links 11 function as draft mediums in the usual manner, they being pivotally associated with the tractor A, and also suitably connected directly to a vertically swingable implement-carrying frame involving fore and aft spaced transversely disposed rails 12 and a plurality of longitudinally disposed spaced rails 13, respectively, these rails 12 and 13, being united together in any suitable manner. The rails 12 are arranged crosswise to the line of draft of the tractor, while the rails 13 follow such line of draft thereof.

Rising above the implement-carrying frame having the rails 12 and 13 at its center is a hanger which includes upwardly convergent bracket-arms 14 and 15, respectively, having connection at their lower ends as at 16 to the intermediate rails 13 of the said implement-carrying frame, while at the upper ends of such arms 14 and 15 is created a pivotal mounting 17 engaged by the throw arm 10, so that when the latter is actuated the implement-carrying frame will be raised and lowered under vertical swing of the latter.

Connected with the implement-carrying frame and the bracket arms are suitable truss or bracing members 18, which serve to give strength and rigidity to the carrying frame setup. The members 18 serve to prevent sagging of the carrying frame in addition to the strengthening thereof. It is preferable to have the carrying frame and the hanger made from metal, although these may be made from any other suitable material, and the rails 12 and 13 are of angle iron formation, while the arms 14 and 15 are of strap formation, yet these, together with the said rails may be otherwise formed.

Flexibly suspended by the carrying frame is a harrow denoted generally at B, comprising as usual one or more main body frames, one being shown and identified at 19, of the ordinary well known construction, having the adjustable harrow teeth 20 depending therefrom for cultivating purposes. The one or more body frames 19, each is flexibly suspended solely by link chains 21, which are arranged at spaced intervals with respect to the said carrying frame, and such chains are detachably and adjustably attached at 22 to the latter, as well as to the main body frame. The chains 22 next to the tractor A or fore of the carrying frame are shorter in length than those aft of the latter, in order to allow the harrow to pull true and not buck up behind when such harrow is in ground working position, and additionally such shorter chains, in this working position of the harrow serve to pull the same. The chains 22 in their series, both fore and aft, are for lifting the harrow B which is the only time that all do any work, under the operation of the hydraulic lift mechanism of the tractor. The front chains 22 preferably are set at a 45 degree angle to the main frame 19 of the harrow B to allow the draft of the same to fall in the ends of the links rather than on the sides of the latter.

As indicated the chains 22 flexibly attach the harrow B to the implement-carrying frame in such a manner that when the hydraulic lift is operated the said frame is raised and the chains 22 lift the harrow sections as a unit. The hanger members 14 and 15 are properly angled to from 75-80 degrees to allow the carrying frame to work well above the harrow B and thus permit complete freedom of action.

The distinctive feature of the present invention resides in the flexibility of the harrow B provided by the chain-like hook-up to the implement-carrying frame, which hook-up is solely with the latter for the draft of such harrow and its raising and lowering movements under the operation of the hydraulic lift mechanism of the tractor A. By this hook-up through the use of the chains 22 when a portion of the harrow B strikes a solid object in the ground the remaining portion of such harrow will not be drawn out out of the ground from working position, this being particularly true when the harrow is made-up of a plurality of frame-sections of the usual construction now commonly used for cultivating purposes.

What is claimed is:

An attachment for a power draft unit having a lift for a ground working element, the lift having upper and lower arms, comprising a vertically swingable carrying frame pivotally connected to the lift, said frame comprising a transverse beam having a plurality of longitudinal arms extending therefrom, said beam being pivotally connected to the lower lift arms, certain of said longitudinal arms being pivotally connected to the upper arms of said lift by means of a triangular bracing structure, coupling means pivotally connected to the transverse beam of the carrying frame and to the implement, spaced chain lengths suspending the implement from the longitudinal arms, said coupling means comprising chain lengths, each throughout its extent being inherently freely flexible in itself and connected at an angle relative to the plane of the carrying frame to the transverse beam of the latter and the implement, respectively, and said spaced chain lengths, each throughout its extent being inherently freely flexible in itself and adjustably and detachably connected to said frame and implement, respectively.

RAY UDY.

REFERENCES CITED

The following references are of record in the file of this patent:

UNITED STATES PATENTS

| Number | Name | Date |
| --- | --- | --- |
| 457,808 | Byers | Aug. 18, 1891 |
| 745,836 | Hartzell | Dec. 1, 1903 |
| 899,215 | Godley | Sept. 22, 1908 |
| 1,333,056 | Anderson | Mar. 9, 1920 |
| 1,501,055 | Lofton | July 15, 1924 |

FOREIGN PATENTS

| Number | Country | Date |
| --- | --- | --- |
| 223,890 | Switzerland | Feb. 1, 1943 |
| 554,033 | Great Britain | June 16, 1943 |